United States Patent
Depalov et al.

(10) Patent No.: US 9,313,353 B2
(45) Date of Patent: Apr. 12, 2016

(54) SCANNER THAT DETECTS DEBRIS

(71) Applicant: Hewlett-Packard Development Company, L.P., Houston, TX (US)

(72) Inventors: Dejan Depalov, Boise, ID (US); Jain Chirag, Bangalore (IN); Craig T. Johnson, San Diego, CA (US); Goudar Chanaveeragouda, Bangalore (IN); Baris Efe, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 8 days.

(21) Appl. No.: 13/905,339

(22) Filed: May 30, 2013

(65) Prior Publication Data

US 2014/0355077 A1 Dec. 4, 2014

(51) Int. Cl.
- *H04N 1/04* (2006.01)
- *H04N 1/40* (2006.01)
- *H04N 1/00* (2006.01)

(52) U.S. Cl.
CPC ................ *H04N 1/00909* (2013.01)

(58) Field of Classification Search
None
See application file for complete search history.

(56) References Cited

U.S. PATENT DOCUMENTS

| | | | | |
|---|---|---|---|---|
| 5,821,977 A * | 10/1998 | Nishimura | ........... | H04N 1/40 347/234 |
| 5,969,371 A * | 10/1999 | Andersen | ........... | B65H 43/08 250/559.15 |
| 6,900,448 B1 * | 5/2005 | Thompson | ......... | H04N 1/00002 250/235 |
| 7,058,236 B2 * | 6/2006 | Ohashi | ........... | H04N 1/00795 358/3.26 |
| 7,183,532 B2 * | 2/2007 | Gann | ........... | G01N 21/94 250/214 C |
| 7,742,180 B2 | 6/2010 | Saida et al. | | |
| 8,010,026 B2 * | 8/2011 | Kobayashi | ........ | G03G 15/0194 399/301 |
| 8,531,743 B2 * | 9/2013 | Wu | ........... | B41J 2/2139 347/19 |
| 8,559,065 B2 * | 10/2013 | Deamer | ......... | H04N 1/125 358/448 |
| 8,786,914 B1 * | 7/2014 | Mui | ........... | H04N 1/00039 358/461 |
| 2002/0176634 A1 * | 11/2002 | Ohashi | ........... | H04N 1/00795 382/275 |
| 2005/0152616 A1 * | 7/2005 | Bailey | ........... | H04N 1/4097 382/275 |
| 2005/0185227 A1 * | 8/2005 | Thompson | ........... | 358/474 |
| 2006/0268377 A1 * | 11/2006 | Haas | ........... | H04N 1/00002 358/504 |
| 2009/0027741 A1 * | 1/2009 | Quah | ........... | H04N 1/00018 358/497 |
| 2009/0190187 A1 * | 7/2009 | Cornell | ........... | B41J 29/393 358/474 |
| 2011/0141535 A1 | 6/2011 | Westcott et al. | | |
| 2012/0044515 A1 * | 2/2012 | Ikegawa | ........... | H04N 1/00013 358/1.13 |
| 2013/0050771 A1 * | 2/2013 | Deamer | ........... | H04N 1/125 358/448 |

OTHER PUBLICATIONS

Canon Image Formula DR-X10C User Manual, (Research Paper), 2007.

* cited by examiner

*Primary Examiner* — Marcus T Riley
(74) *Attorney, Agent, or Firm* — HP Inc. Patent Department

(57) ABSTRACT

A scanner is disclosed. The scanner detects when the to surface of the ADF scan glass is contaminated.

13 Claims, 7 Drawing Sheets

SCANNER THAT DETECTS DEBRIS

BACKGROUND

Scanners are used to create digital copies of documents or objects. There are many types of scanners, for example sheet feed scanners, flatbed scanners, stand alone scanners and scanners integrated into multifunctional printers (MFPs).

DETAILED DESCRIPTION

Flatbed scanners move the scan sensor relative to a page placed on a scan platen. When dust or debris is located on the top surface of the scan platen, the dust or debris shows up in the scanned image as small dots or specks. Sheet-feed scanners move pages across an automatic document feeder (ADF) scan glass that has a scan sensor fixed in place underneath the glass. When dust or debris is located on the top surface of the glass, the image of the dust or debris ends up as long vertical streaks in the image. These long vertical streaks are much more visible in the final image and therefore present more of a problem than the small dots or specks. If the dust or dirt can be detected on the top surface of the glass, the user can be warned and asked to clean the glass before the next scan occurs. Many flatbed scanners operate in the same way that a sheet-feed scanner operates when using an ADF (i.e. the scan sensor remains in a fixed location while the media is moved past the sensor).

In one example, dirt or debris can be detected by scanning a page moving through the ADF and comparing that scan to a scan of a stationary object like a stationary calibration strip. Both scans are examined to locate any long vertical streaks in the image. The positions of the long vertical streaks in the two images are compared. If a long vertical streak is located in the same position in both images it indicates that the top of the ADF scan glass is contaminated at that location. If the long vertical streak only shows up in the image of the page, then that streak is actually present in the original page. If the long vertical streak only shows up in the image of the calibration strip, then the calibration strip is contaminated at that location. By comparing a scan of a stationary object with a scan of a moving object, the location of contamination on the top surface of the ADF scan glass can be determined.

Figure 1:
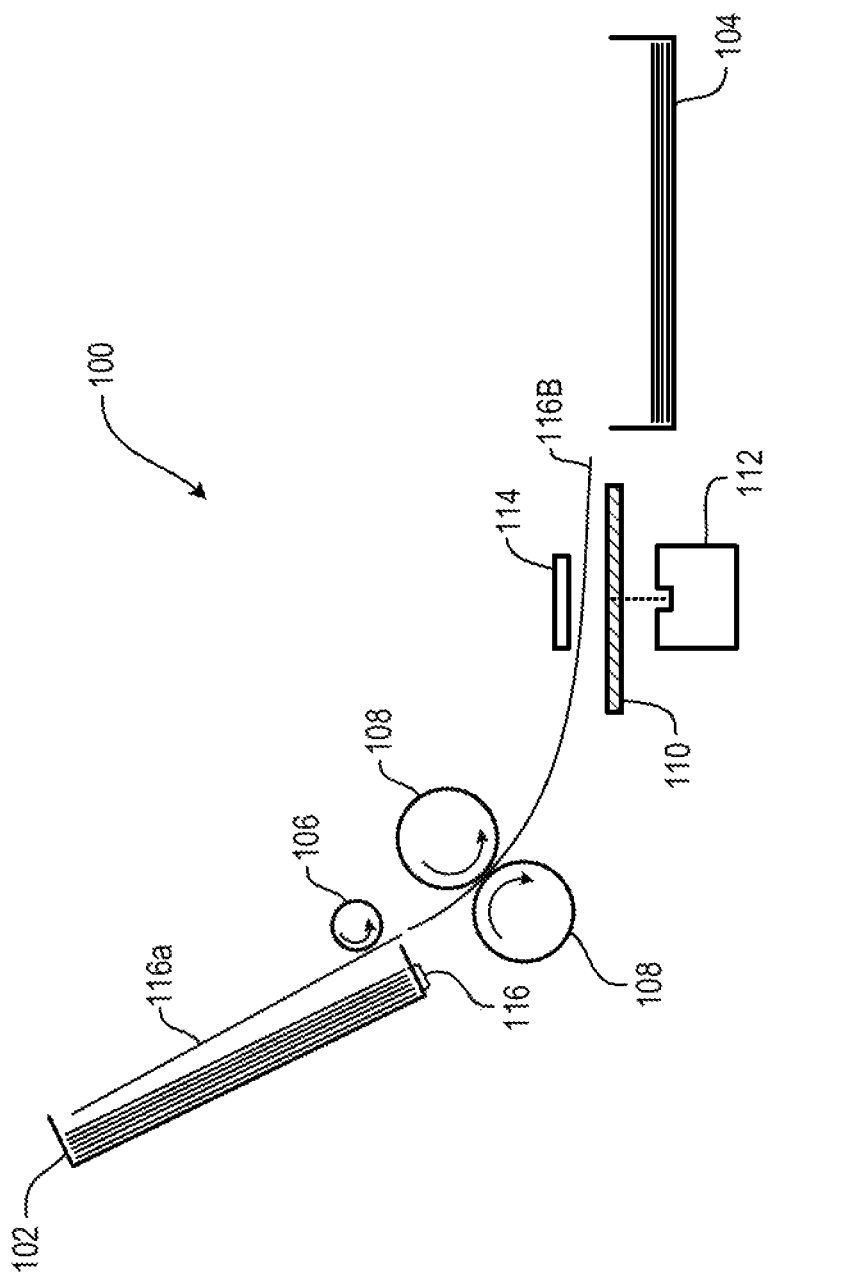
FIG. 1 is a schematic side view of an example sheet-feed scanner 100.

FIG. 1 is a schematic side view of an example sheet-feed scanner 100. Sheet-feed scanner 100 comprises an input tray 102, an output tray 104, a pick roller 106, drive wheels 108, automatic document feeder (ADF) scan glass 110, scan sensor 112 and calibration strip 114. Pages 116 are shown loaded into input tray 102. During a scan pick roller 106 moves the top page 116a in input tray 102 towards drive wheels 108. Page 116b is shown in the ADF paper path between drive wheels 108. Drive wheels 108 move page 116b between the calibration strip 114 and the ADF scan glass 110. Scan sensor 112 is positioned underneath the ADF scan glass 110 and captures an image of the bottom surface of page 116b as it moves across ADF scan glass 110. Once the page moves across the ADF scan glass 110 it is deposited into output tray 104. Scanner 100 may also comprise a housing, a drive system with motors and gears, electronics used to control the scanner and the like, but these items are not shown for clarity.

In this application "ADF scan glass" will be defined as any transparent material located between the scan sensor and the calibration strip in the ADF paper path. In some examples of a sheet-feed scanner, a single piece of glass is typically positioned between the scan sensor and the calibration strip (as shown in FIG. 1). In this example the single piece of glass would be the ADF scan glass. In one example of a flatbed scanner, the scanner may have a piece of glass for ADF scans and a separate piece of glass for flatbed scan (see FIG. 5). The piece of glass used for ADF scans is typically called an ADF step glass and the separate piece of glass used for flatbed scans is typically called the scan platen. In this example the ADF step glass would be the ADF scan glass. In another examples of a flatbed scanner, a single piece of glass may be used for both the ADF scan glass and the flatbed scan platen. In yet another example, a flexible transparent material, like Mylar, may be used as the ADF scan glass.

Calibration strip 114 is positioned above ADF scan glass 110 and aligned with scan sensor 112. When there are no pages in the paper path between the ADF scan glass 110 and the calibration strip 114 the scan sensor 112 can view the bottom surface of the calibration strip 114. In one example, during a single scan of a page, the seamier will start scanning a little before the page reaches the scan sensor, of will continue to scan for a little while after the page has passed by the scan sensor.

Figure 2:
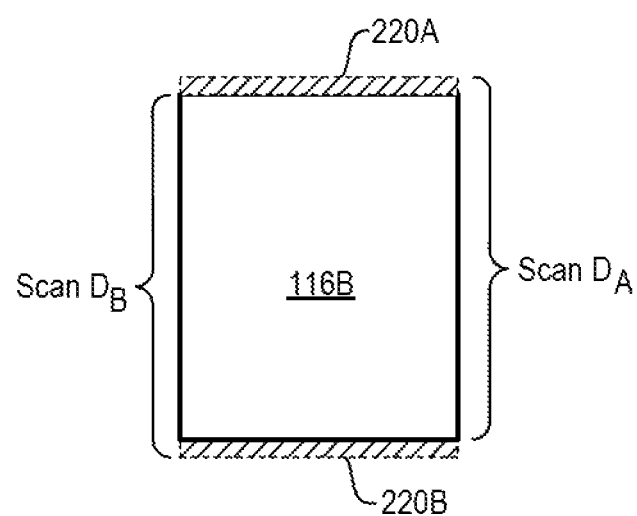
FIG. 2 is a top view of an example scan area for a page 116b.

FIG. 2 is a top view of an example scan area for a page 116b. On the right side of page 116b the single scan distance $D_A$ shows the scan area when the seamier starts the scan before the top edge of page 116b reaches the scan sensor 112. Area 220A will be an image of the bottom surface of the stationary calibration strip 114. Because this area is an image of the stationary calibration strip, it will be called stationary calibration data. The rest of the scan data will contain an image of the bottom surface of page 116b as it moves past the scan sensor 112. A small portion of this scan data, typically near the top or bottom edge of page 116b, will be selected as moving calibration. data.

On the left side of page 116b the scan distance $D_B$ shows the scan area when the scanner ends the scan after the bottom edge of page 116b passes the scan sensor 112. Area 220B will be an image of the bottom surface of the stationary calibration strip 114. Because this area is an image of the stationary calibration strip, it will be called stationary calibration data. The rest of the scan data will contain an image of the bottom surface of page 116b as it moves past the scan sensor 112. A small portion or segment of this scan data, typically near the top or bottom edge of page 116b, will be selected as moving calibration data. In another example, the stationary calibration data may be captured and stored at a time different from when a user is scanning a page.

Figure 3:
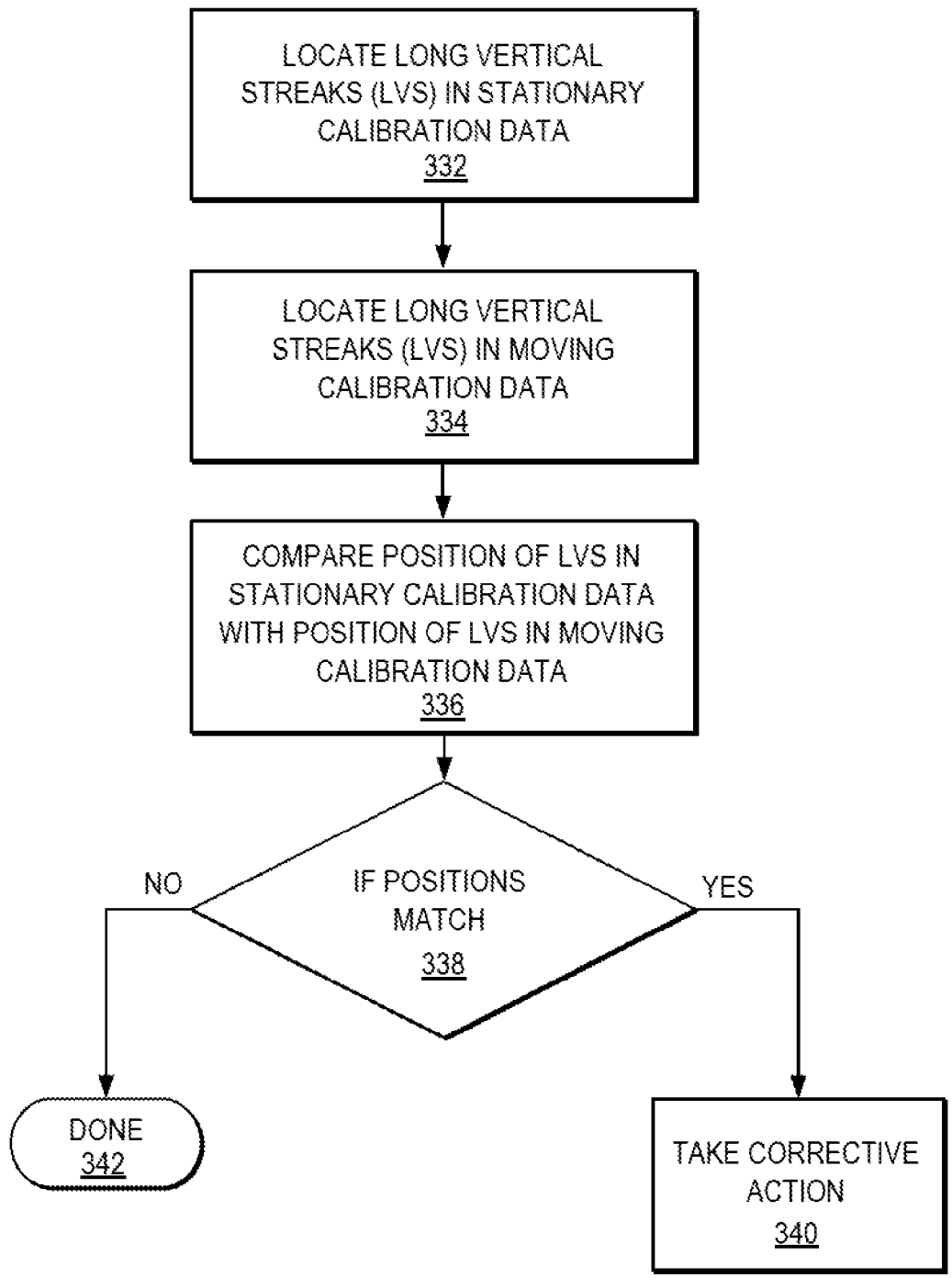
FIG. 3 is a flow chart for an example method of determining debris on the top surface of the ADF scan glass 110.

Using the stationary calibration data and the moving calibration data it can be determined when dirt, dust or any type of debris is located on the top surface of ADF scan glass, above and inline with the scan sensor 112. FIG. 3 is a flow chart for an example method of determining debris on the top surface of the ADF scan glass 110. Flow starts at 332 where the positions of ally long vertical streaks (LVS) are determined in the stationary calibration data. Flow continues at 334 where the positions of any long vertical streaks (LVS) are determined in the moving calibration data. Flow continues at 336 where the positions of the LVS in the stationary calibration data are compared with the position of the LVS in the moving calibration data. If a LYS in the stationary data matches the position of a LVS in the moving calibration data (at 338) it indicates that there is debris on the top surface of the ADF scan glass. When debris has been detected flow continues at 340. At 340 corrective action is taken. In some examples, corrective action includes alerting the user that the top surface of the ADF scan glass is dirty and indicating it should be cleaned.

When the position of a LVS in the stationary calibration data does not match the position of a LYS in the moving calibration data (i.e. the streak is not in the moving calibration data) the calibration strip is contaminated at this location. In some examples the user may be asked to clean the calibration strip in addition to, or in place of, cleaning the top surface of the ADF scan glass.

Long vertical streaks can be located using a number of different techniques. In one example continuous vertical edge patterns are used. The dust streaks typically give a more continuous vertical edge pattern as compared to the other factors in moving calibration data. In order to measure the strength of vertical edge continuity, the number of contiguous edge pixels in each column is determined by traversing top to bottom along the streak. In other examples a threshold may be used on the image and the number of contiguous black pixels in each column can be counted.

Figure 4:
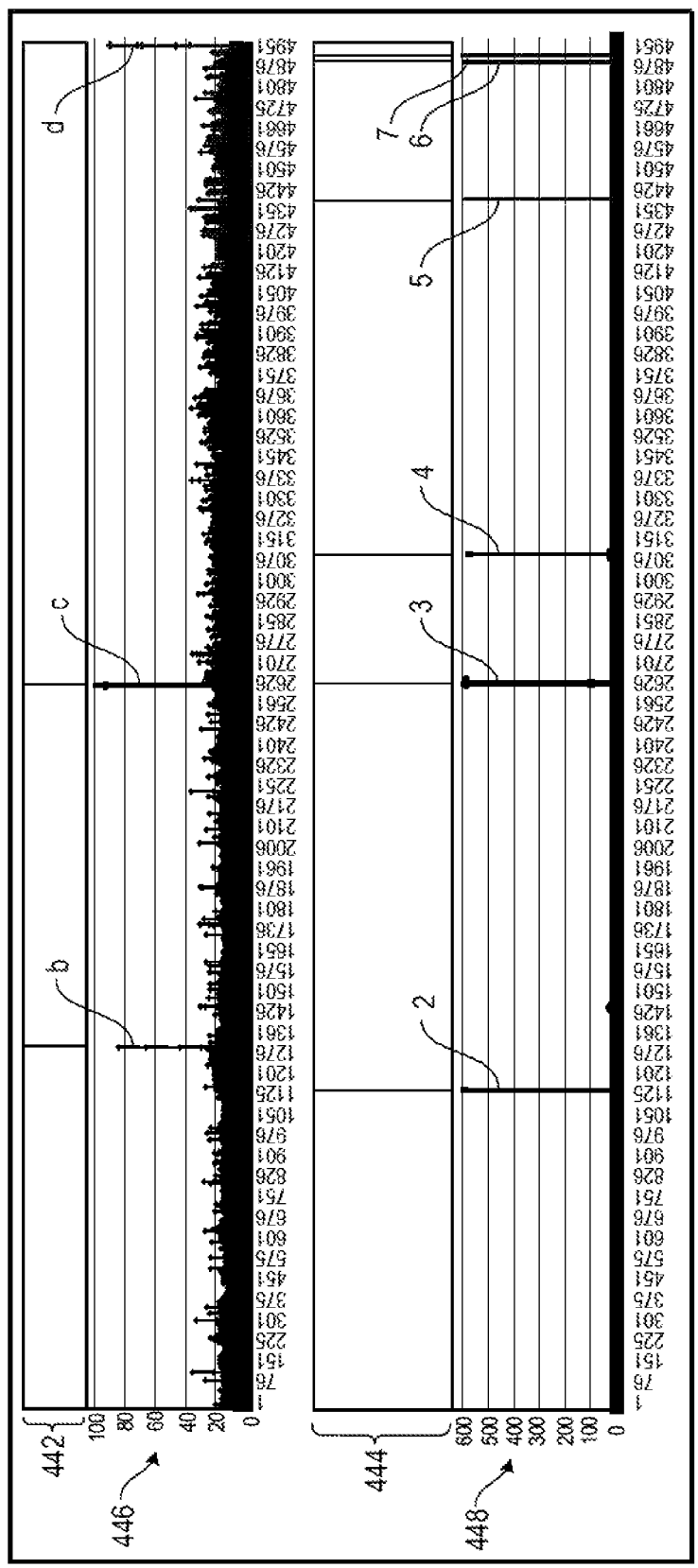
FIG. 4 is two example charts showing the length and position of the streaks in stationary and moving calibration data.

FIG. 4 is two example charts showing the length and position of the streaks in stationary and moving calibration data. Area 442 is an image of the moving calibration data. Chart 116 is a graph of the height and position of vertical streaks in the moving calibration data. The vertical axis is the height of the streak and the horizontal axis is the position of the streak in the image. Most vertical streaks in the image are not very long. However there are a number of long vertical streaks (LVS). These LVS are marked as b, c and d. A long vertical streak is any streak longer than a given threshold, for example 75% or longer than the length of the image.

Area 444 is an image of the stationary calibration data. Chart 448 is graph of the height and position of vertical streaks in the stationary calibration data. The vertical axis is the height of the streak and the horizontal axis is the position of the streak in the image. Most vertical streaks in the image are not very long. However there are a number of long vertical streaks (LVS). These LVS are marked as 2, 3, 4, 5, 6 and 7.

Comparing the locations or position of the LVS in the stationary calibration data with the location or position of the LVS in the moving calibration data will determine if the top surface of the ADF scan glass is contaminated with debris or if the bottom surface of the calibration strip is contaminated with debris. LVS b and d only occur in the moving calibration data. Therefore these LVS are in the image of the page being scanned. LVS 2, 4, 5, 6 and 7 occur only in the stationary calibration data. These LVS indicate that there is dust or debris located on the calibration strip at these locations and corrective action can be taken. LVS c in the moving calibration data is in the same position as LVS 3 in the stationary calibration data. This indicates that there is dust or debris located on the top surface of the ADF scan glass in this locations and corrective action can be taken.

Figure 5:
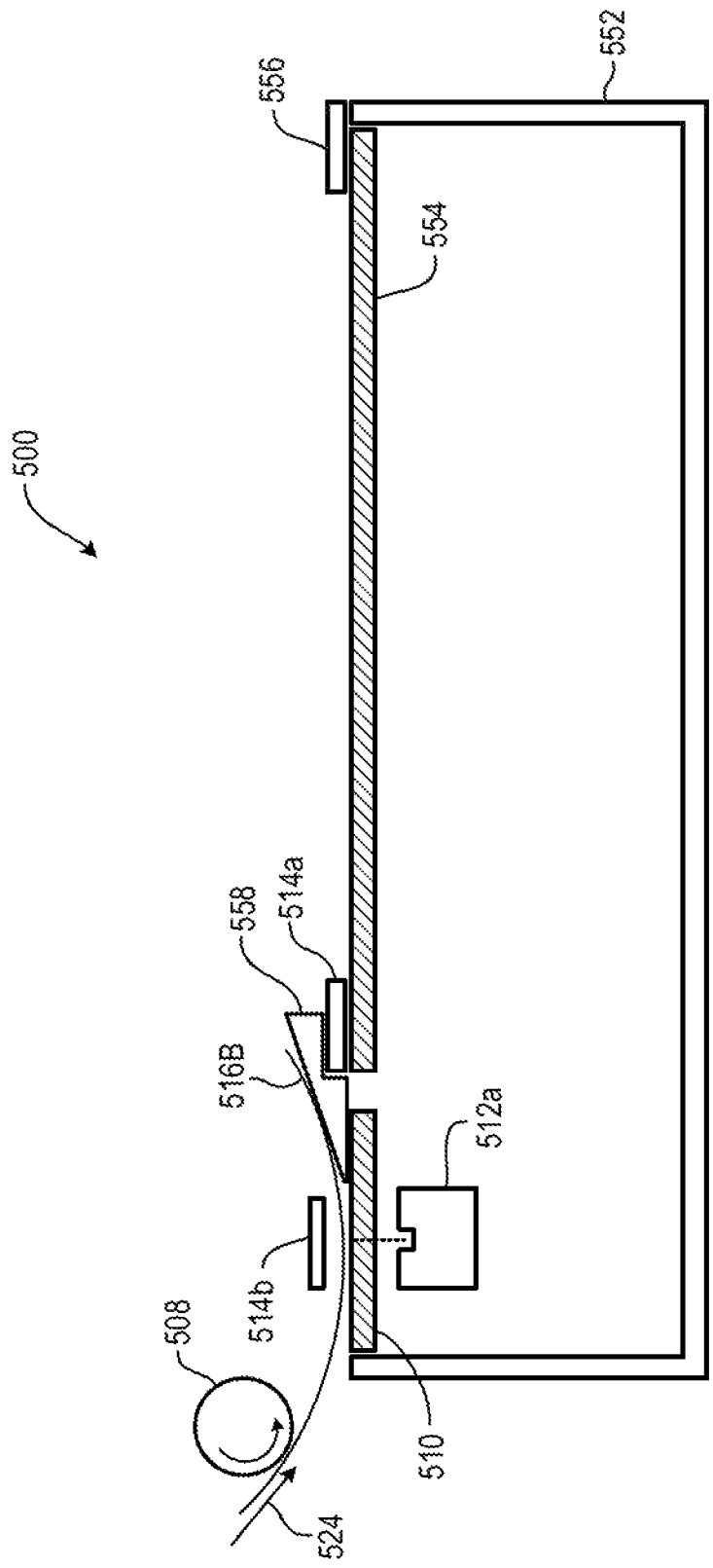
FIG. 5 is a schematic side view of an example flatbed scanner 500.

FIG. 5 is a schematic side view of an example flatbed scanner 500. Scanner 500 comprises a scanner base 552, a top bezel 556, a flatbed scan platen 554, a flatbed scan sensor 512, an automatic document feeder (ADF) exit ramp 558, an ADF scan glass 510, an ADF calibration strip 514b and a flatbed calibration strip 514a. Scanner base 552 is generally a hollow rectangular box that supports the flatbed scan platen 554 and the ADF scan glass 510 around their edges. Top bezel 556 fits on top of the flatbed scan platen 554 and the ADF scan glass 510 and attaches to the scanner base 552 thereby holding the flatbed scan platen 554 and the ADF scan glass 510 in place. The flatbed scan platen 554 is fabricated from a transparent material, for example glass. The top surface of the flatbed scan platen forms a flatbed scan area.

The flatbed calibration strip 514a is positioned on top of the flatbed scan platen 556. The ADF exit ramp 558 covers the calibration strip. Scanner base 552 also supports a drive system (not shown for clarity) that moves the flatbed scan sensor 512a along the underside of the ADF scan glass 510 and the flatbed scan platen 554. The flatbed scan sensor 512a is shown located at the ADF scan position. An ADF is positioned on the top side of scanner base 552 above the ADF scan glass 510. The top surface of the ADF scan glass forms an ADF scan area.

ADF comprises an ADF feed guide 508. The ADF may also comprise a housing, an input tray, and output tray and a paper transport system containing motors, belts, paper picking mechanisms and the like, but these items are not shown for clarity. ADF exit ramp 558 is positioned on top of ADF scan glass 510. ADF exit ramp 558 helps guide pages through the ADF paper path and into an output tray (not shown for clarity). A page 116b is shown in the ADF paper path. The paper feeding direction is shown by arrows 524. The ADF paper path goes from an input tray, around ADF feed guide 508, across the ADF scan glass 510, up the ADF exit ramp 558 and into an output tray.

During an ADF scan the flatbed scan sensor 512s remains fixed in a positioned underneath the ADF scan glass 510 (as shown). As the page moves through the ADF paper path the flatbed scan sensor 510 remains stationary and captures an image of the downward facing side of the page as it passes above the flatbed scan sensor 512a.

During a flatbed scan, the page would be placed onto the flatbed scan platen 554 and the flatbed scan sensor 512a would move along the length of the flatbed scan platen capturing an image of the downward facing side of the page.

The flatbed scanner 500 can use the same method to detect debris on the top surface of the ADF scan glass 510 as describe above for the sheet-feed scanner. The scanner 500 can capture stationary calibration data of the bottom surface of the ADF calibration strip 514b during a time when there is no paper in the ADF paper path. The scanner 500 can capture moving calibration data when a page is being moved across the ADF scan glass during an ADF scan. The scanner 500 can then determine the location of LVS in the image of both the stationary and moving calibration data. When a LVS is in the same location in both images debris is located in that position on top of the ADF scan glass and corrective action can be taken.

Corrective action for a flatbed seamier can include moving the location of the flatbed scan sensor by a small amount for an ADF scan. If debris is detected in the new location additional locations can be tried. If a location without debris can't be found, the user can be notified that the top surface of the ADF scan glass needs to be cleaned.

Figure 6:
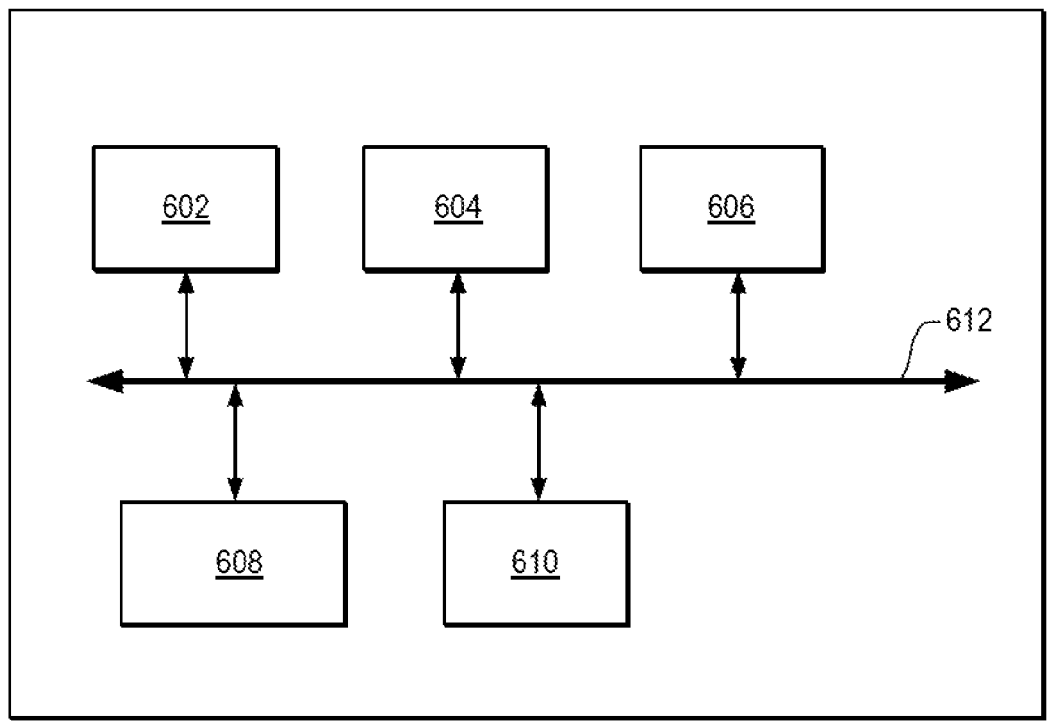
FIG. 6 is an example block diagram of a scanner.

FIG. 6 is an example block diagram of a scanner. Scanner comprises a. processor 602, memory 604, input/output (I/O) module 606, display 608 and controller 610 all coupled together on bus 612. In some examples scanner may also have a user interface module, an input device, and the like, but these items are not shown for clarity. Processor 602 may comprise a central processing unit (CPU), a micro-processor, an application specific integrated circuit (ASIC), or a combination of these devices. Memory 604 may comprise volatile memory, non-volatile memory, and a storage device. Memory 604 is a non-transitory computer readable medium. Examples of non-volatile memory include, but are not limited to, electrically erasable programmable read only memory (EEPROM) and read only memory (ROM). Examples of volatile memory include, but are not limited to, static random access memory (SRAM), and dynamic. random access memory (DRAM). Examples of storage devices include, but are not limited to, hard disk drives, compact disc drives, digital versatile disc drives, optical drives, and flash memory devices.

I/O module 606 is used to couple seamier to other devices, for example the Internet or a computer. Scanner has code, typically called software, stored in the memory 604. The software is stored as computer readable instructions in the non-transitory computer readable medium (i.e. the memory 604). Processor 602 generally retrieves and executes the instructions stored in the non-transitory computer-readable medium to operate the scanner and to execute functions. In one example, the processor executes code that detects debris in the scanner.

Figure 7:
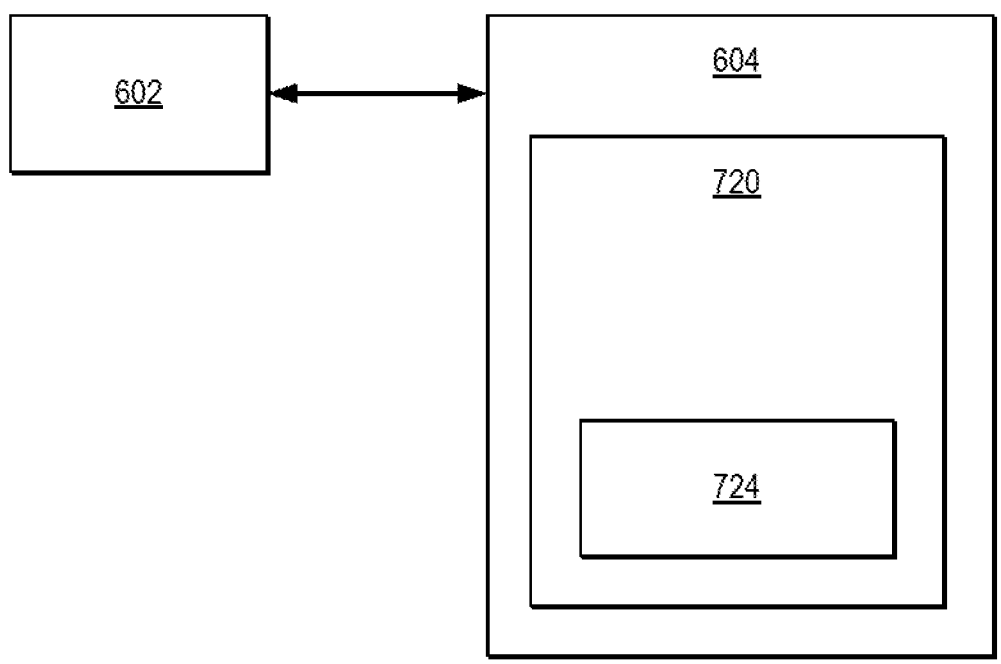
FIG. 7 is an example block diagram of the processor 602 coupled to memory 604.

FIG. 7 is an example block diagram of the processor 602 coupled to memory 604. Memory 604 contains software 720. Software 720 contains a debris detection module 724. The processor 602 executes the code in debris detection module 724 to detect debris on the ADF scan glass.

The scanners described above may be integrated into a multifunction peripheral (MFP). A multifunction peripheral (MFP) is a device that typically contains a printer and an imaging system, typically a seamier. The MFP can be used as a printer, a scanner, a copier, a facsimile machine (FAX) or the like. MFPs are also called all-in-one devices (AiO), multifunction devices, multifunction printers or the like.

What is claimed is:

1. A scanner, comprising:
   a calibration strip having a bottom surface;
   an automatic document feeder (ADF) scan glass located underneath the calibration strip, the ADF scan glass having a top surface;
   a scan sensor located underneath the ADF scan glass, where the scan sensor can view the bottom surface of the calibration strip;
   an ADF to feed sheets across the ADF scan glass during a scan;
   a processor to control the scanner, the processor coupled to the ADF and the scan sensor;
   memory coupled to the processor, the memory having a debris detection module loaded therein,
   the debris detection module, when executed by the processor, causing the scanner to:
   locate a position for each long vertical streak (LVS) detected in a segment of the scan of a sheet being fed past the ADF scan glass; and
   compare the position of each LVS in the segment of the scan of the sheet being fed across the ADF scan glass to a scan of the calibration strip, to determine when the ADF scan glass has debris located on the top surface, wherein the scan of the calibration strip is done with no relative motion between the scan sensor and the calibration strip;
   the debris detection module to take corrective action when debris are located on the top surface.

2. The scanner of claim 1, wherein a type of scanner is selected from the following group of scanner types: a sheet-feed scanner, a flatbed scanner, a multi-function peripheral (MFP).

3. The scanner of claim 1, wherein the scan of the calibration strip is done at a time different than the time the scan of a sheet being fed past the ADF scan glass is done.

4. The scanner of claim 1, wherein the scan of a sheet being fed past the ADF scan glass is begun before the sheet reaches the scan sensor or is continued beyond when the sheet moves past the scan sensor.

5. The scanner of claim 1, wherein the debris detection module also determines when the calibration strip has debris located on a bottom surface, wherein the debris detection module takes corrective action when debris are located on the bottom surface.

6. The scanner of claim 1, wherein determining when the ADF scan glass has debris located on the top surface further comprises:
   locating a position for each LVS detected in the scan of the calibration strip;
   comparing the position of each LVS from the segment of the scan of the sheet being fed past the ADF scan glass to the position of each LVS from the scan of the calibration strip;
   when a LVS in both the scan of the segment of the sheet being fed past the ADF scan glass and the scan of the calibration strip are in the same position then debris is located on the ADF scan glass at that position.

7. A method of detecting debris on a scanner, comprising:
   comparing stationary calibration data with moving calibration data to detect when debris is located on an ADF scan glass;
   taking corrective action when debris are detected;
   wherein stationary calibration data is data from a scan of a stationary calibration strip scanned with a stationary scan sensor and moving calibration data is data from a scan of a sheet of media as the sheet of media is moved with respect to the stationary scan sensor and wherein determining when debris is located on the ADF scan glass further comprises:
   locating a position for each long vertical streak (LVS) detected in the moving calibration data, wherein the position of each LVS in the moving calibration data is compared to the stationary calibration data to detect when debris is located on the ADF scan glass.

8. The method of claim 7, wherein determining when debris is located on the ADF scan glass further comprises:
   locating a position for each LVS detected in the stationary calibration data;
   comparing the position of each LVS from the moving calibration data to the position of each LVS from the stationary calibration data;
   when a LVS in both the moving calibration data and the stationary calibration data are in the same position then debris is located on the ADF scan glass at that position.

9. The method of claim 7, further comprising:
   detecting when the stationary calibration strip has debris located on a bottom surface; taking corrective action when debris are detected on the calibration strip.

10. The method of claim 9, wherein determining when debris is located on the bottom surface of the calibration strip further comprises:
    locating a position for each long vertical streak (LVS) detected in the moving calibration data;
    locating a position for each LVS detected in the stationary calibration data;

comparing the position of each LVS from the moving calibration data to the position of each LVS from the stationary calibration data;

when a LVS is only located in the stationary calibration data then debris is located on bottom surface at that location.

11. The method of claim 7, wherein the moving calibration data and the stationary calibration data is captured during a single scan.

12. The method of claim 7, wherein the moving calibration data is a small segment of data near a top edge of the sheet of media or near a bottom edge of the sheet of media.

13. The method of claim 7, wherein a type of scanner is selected from the following group of scanner types: a sheet-feed scanner, a flatbed scanner, a multi-function peripheral (MFP).

\* \* \* \* \*